United States Patent
Chuang et al.

[11] Patent Number: 6,139,981
[45] Date of Patent: Oct. 31, 2000

[54] MAGNETIC THIN FILM MEDIUM WITH ADHESION ENHANCEMENT LAYER

[75] Inventors: Elsie Yang Chuang, Saratoga; Phuong Nguyen; Qixu David Chen, both of Milpitas; Xing Song; Charles Leu, both of Fremont; Thanh Thien Ha, San Jose, all of Calif.

[73] Assignee: Seagate Technology, Inc., Scotts Valley, Calif.

[21] Appl. No.: 09/152,324

[22] Filed: Sep. 14, 1998

Related U.S. Application Data

[60] Provisional application No. 60/063,234, Oct. 23, 1997.

[51] Int. Cl.$^7$ .................................................. G11B 5/66
[52] U.S. Cl. ........................ 428/694 T; 428/694 TS; 428/336; 428/900
[58] Field of Search .................. 428/694 T, 694 TS, 428/900, 336

[56] References Cited

U.S. PATENT DOCUMENTS

| | | | |
|---|---|---|---|
| 4,900,397 | 2/1990 | Werner et al. | 216/22 |
| 5,273,834 | 12/1993 | Hoover et al. | 428/694 ST |
| 5,302,434 | 4/1994 | Doerner et al. | 428/65.6 |
| 5,980,997 | 11/1999 | Ross et al. | 427/555 |

OTHER PUBLICATIONS

Tsai, et al "The Effects of Ni$_3$P–Sublayer . . . "IEE Transaction on Magnetics, vol. 28, No. 5, Sep. 1992.

Hsiao–chu Tsai et al., "The Effects of Ni$_3$P–sublayer on the Properties of CoNiCr/Cr Media Using Different Substrates," IEEE Trans. on Magn., vol. 28, p. 3093, 1992.

B.Y. Wong et al., "Investigation of CoNiCr Thin Films Deposited on [100] and [110] Cr Single Crystals," IEEE Transactions on Magnetics, vol. 27, No. 6, Nov. 1991, pp. 4733–4735.

M. Mirzamaani et al., "Magnetic properties of CoPtCr thin films with <1120> crystal orientation." J. Appl. Phys. 69 (8), Apr. 15, 1991, pp. 5169–5170.

T. Min et al., "Bicrystal advanced thin–film media for high density recording," J. Appl.Phys. 75 (10), May 15, 1994, pp. 6129–6131.

J. Ding et al., "Microstructure and Recording Properties of Bicrystal Disks with GaAs Substrates," IEEE Transactions on Magnetics, vol. 30, No. 6, Nov. 1994, pp. 3978–3980.

M. Futamoto et al., "Magnetic and Recording Characteristics of Bicrystalline Longitudinal Recording Medium Formed on a MgO Single Crystal Disk Substrate," IEEE Transactions on Magnetics, vol. 30,No. 6, Nov. 1994, pp. 3975–3977.

X. Ye et al., "Modeling of thin–film media with advanced microstructure for ultrahigh density recording," J. Appl. Phys. 75 (10), May 15, 1994, pp. 6135–6137.

T.P. Nolan et al., "Effect of microstructural features on media noise in longitudinal recording media," J. Appl. Phys. vol. 73, No. 10, May 15, 1993, pp. 5566–5568.

Q. Peng et al., "Micromagnetic and Experimental Studies of CoPtCr Bicrystal Thin Film Media," JA–01, Intermag Conference, San Antonio, Texas, Apr. 1995.

Y. Hosoe et al., "Bicrystal Cluster Structure and Magnetic Properties of CoCrTa/Cr Thin Film Media," JA–02, Intermag Conference, San Antonio, Texas, Apr. 1995.

J. Ding et al. "Fabrication and Recording Performances of Bicrystal Disks on GaAs Substrates," Journal of The Magnetics Society of Japan, vol. 18, Supplement, No. S1 (1994).

Ding et al., "Experimental Study on Recording and Track Edge Characteristics of Bicrystal Thin Film Media," IEEE Trans. Magn., Mag–31, p. 2827, 1995.

*Primary Examiner*—Leszek Kiliman
*Attorney, Agent, or Firm*—McDermott, Will & Emery

[57] ABSTRACT

Adhesion between a deposited seed layer, e.g., a sputter-deposited NiP seed layer, on an alternate substrate, such as a glass, ceramic or glass-ceramic substrate, is significantly enhanced by depositing a chromium or chromium-alloy adhesion enhancement film between the substrate and seed layer. Magnetic recording media comprising a surface-oxidized NiP seed layer and chromium adhesion enhancement film exhibit low media noise and are suitable for high density longitudinal magnetic recording.

20 Claims, 3 Drawing Sheets

MAGNETIC THIN FILM MEDIUM WITH ADHESION ENHANCEMENT LAYER

RELATED APPLICATIONS

This application claims priority from provisional patent application Ser. No. 60/063,234 filed Oct. 23, 1997, entitled "MAGNETIC THIN FILM MEDIUM WITH ADHESION ENHANCEMENT LAYER," the entire disclosure of which is hereby incorporated herein by reference.

TECHNICAL FIELD

The present invention relates to a magnetic recording medium, such as a thin film magnetic recording disk, and to a method of manufacturing the medium. The invention has particular applicability to a magnetic recording medium exhibiting low noise, high coercivity and suitable for high density longitudinal recording.

BACKGROUND ART

The requirements for high areal density longitudinal recording impose increasingly greater requirements on thin film magnetic recording media in terms of coercivity, remanent squareness, low medium noise and narrow track recording performance. It is extremely difficult to produce a magnetic recording medium satisfying such demanding requirements, particularly a high density magnetic rigid disk medium for longitudinal recording.

The linear recording density can be increased by increasing the coercivity of the magnetic recording medium. However, this objective can only be accomplished by decreasing the medium noise, as by maintaining very fine magnetically noncoupled grains. Medium noise is a dominant factor restricting increased recording density of high density magnetic hard disk drives. Medium noise in thin films is attributed primarily to inhomogeneous grain size and intergranular exchange coupling. Therefore, in order to increase linear density, medium noise must be minimized by suitable microstructure control.

A substrate material conventionally employed in producing magnetic recording rigid disks comprises an aluminum-magnesium (Al-Mg) alloy. Such Al-Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glasses, e.g., an amorphous glass, glass-ceramic materials which comprise a mixture of amorphous and crystalline materials, and ceramic materials. Glass-ceramic materials do not normally exhibit a crystalline surface. Glasses and glass-ceramics generally exhibit high resistance to shocks. The use of glass-based materials, such as glass-ceramic materials, is disclosed by Hoover et al., U.S. Pat. No. 5,273,834.

A conventional longitudinal recording disk medium is depicted in FIG. 1 and typically comprises a non-magnetic substrate 10 having sequentially deposited on each side thereof an underlayer 11, such as chromium (Cr) or a Cr-alloy, a magnetic layer 12, typically comprising a cobalt (Co)-base alloy, and a protective overcoat 13, typically containing carbon. Conventional practices also comprise bonding a lubricant topcoat (not shown) to the protective overcoat. Underlayer 11, magnetic layer 12 and protective overcoat 13 are typically deposited by sputtering techniques. The Co-base alloy magnetic layer deposited by conventional techniques normally comprises polycrystallites epitaxially grown on the polycrystal Cr or Cr-alloy underlayer.

Conventional methods for manufacturing a magnetic recording medium with a glass or glass-ceramic substrate comprise applying a seed layer between the substrate and underlayer. Such magnetic recording media with glass or glass-ceramic substrates are commercially available from different manufacturers with different seed layer materials to reduce the effect of high thermal emissivity of such glass and glass-ceramic substrates, and to influence the crystallographic orientation of subsequently deposited underlayers and magnetic layers. Such conventional seed layer materials also include NiP which is typically sputter deposited on the surface of the glass or glass-ceramic substrate at a thickness of about 500 Å. Sputtered NiP films on glass or glass-ceramic substrates were reported in the literature for the control of crystallographic orientation of the magnetic media and the enhancement of coercivity (for example, Hsiao-chu Tsai et al., "The Effects of $Ni_3P$- sublayer on the Properties of CoNiCr/Cr Media Using Different Substrates," IEEE Trans. on Magn., Vol. 28, p. 3093, 1992).

Conventional magnetic recording media comprising a glass or glass-ceramic substrate having NiP sputtered thereon also comprise, sequentially deposited thereon, a Cr or Cr-alloy underlayer at an appropriate thickness, e.g., about 550 Å, a magnetic layer such as Co-Cr-platinum (Pt)-tantalum (Ta) at an appropriate thickness, e.g., about 350 Å, and a protective carbon overcoat at an appropriate thickness, e.g., about 150 Å. Conventional Cr-alloy underlayers comprise vanadium (V) or titanium (Ti). Other conventional magnetic layers are CoCrTa, CoCrPtB, CoCrPt and CoNiCr. The seed layer, underlayer, and magnetic layer are conventionally sequentially sputter deposited on the glass or glass-ceramic substrate in an inert gas atmosphere, such as an atmosphere of pure argon. A conventional protective carbon overcoat is typically deposited in a mixture of argon with nitrogen, hydrogen or ethylene. Conventional lubricant topcoats are typically about 20 Å thick.

Magnetic films exhibiting a bicrystal cluster microstructure are expected to exhibit high coercivity, low noise and high remanent squareness. In co-pending application Ser. No. 08/586,571 filed on Jan. 16, 1996, now U.S. Pat. No. 5,830,584, issued Nov. 3, 1998, a magnetic recording medium is disclosed comprising a glass or glass-ceramic substrate and a magnetic layer exhibiting a bicrystal cluster microstructure. The formation of a bicrystal cluster microstructure is induced by oxidizing the surface of a seed layer so that the underlayer subsequently deposited thereon exhibits a (200) crystallographic orientation which, in turn, induces a bicrystal cluster microstructure in a magnetic alloy layer deposited and epitaxially grown on the underlayer.

U.S. Pat. No. 5,733,370 discloses a method of manufacturing a magnetic recording medium comprising a glass or glass-ceramic substrate and a magnetic layer exhibiting a bicrystal cluster microstructure. The disclosed method comprises sputter depositing an NiP seed layer on a glass or glass-ceramic substrate and subsequently oxidizing the deposited NiP seed layer. The oxidized upper seed layer surface induces the subsequently deposited underlayer to exhibit a (200) crystallographic orientation which, in turn, induces the magnetic alloy layer deposited and epitaxially grown on the underlayer to exhibit a bicrystal cluster microstructure. The magnetic recording media disclosed in co-pending application Ser. No. 08/586,571, now U.S. Pat. No. 5,830,584 and U.S. Pat. No. 5,733,370 exhibit high coercivity, low magnetic remanence (Mr) x thickness (t) and low noise, thereby rendering them particularly suitable for longitudinal recording. The entire disclosures of U.S. Pat. No. 5,830,584 and U.S. Pat. No. 5,733,370 are incorporated by reference herein.

After extensive experimentation and investigation, it was found that the adhesion between seed layers, particularly nickel-phosphorous seed layers, and non-conventional substrates, such as glass, ceramic or glass-ceramic substrates, is undesirably low and is not suitable for certain applications, as in high temperature and high humidity environments. Accordingly, there exists a need to enhance the adhesion between seed layers, such as nickel-phosphorous layers, and alternate substrates, such as glass, ceramic, or glass-ceramic substrates, to produce a magnetic rigid disk media for longitudinal recording, in various types of environments, exhibiting low medium noise and high coercivity in an efficient, cost-effective manner with high production throughput.

DISCLOSURE OF THE INVENTION

An advantage of the present invention is a magnetic recording medium exhibiting low noise and high coercivity.

Another advantage of the present invention is a method of manufacturing a magnetic recording medium exhibiting low noise and high coercivity.

Additional advantages and other features of the invention will be set forth in part in the description which follows and in part will become apparent to those having ordinary skill in the art upon examination of the following or may be learned from the practice of the invention. The advantages of the invention may be realized and obtained as particularly pointed out in the appended claims.

According to the present invention, the foregoing and other advantages are achieved in part by a magnetic recording medium comprising: a substrate comprising a glass, ceramic or glass-ceramic material; an adhesion enhancement layer on the substrate; a seed layer on the adhesion layer; an underlayer on the seed layer; and a magnetic layer on the underlayer.

Another aspect of the present invention is a method of manufacturing a magnetic recording medium, which method comprises: depositing an adhesion enhancement layer on a substrate comprising a glass, ceramic or glass-ceramic material; depositing a seed layer on the adhesion layer; depositing an underlayer on the seed layer; and depositing a magnetic layer on the underlayer.

Additional advantages of the present invention will become readily apparent to those skilled in this art from the following detailed description, wherein only the preferred embodiment of the present invention is shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE INVENTION

Figure 1:
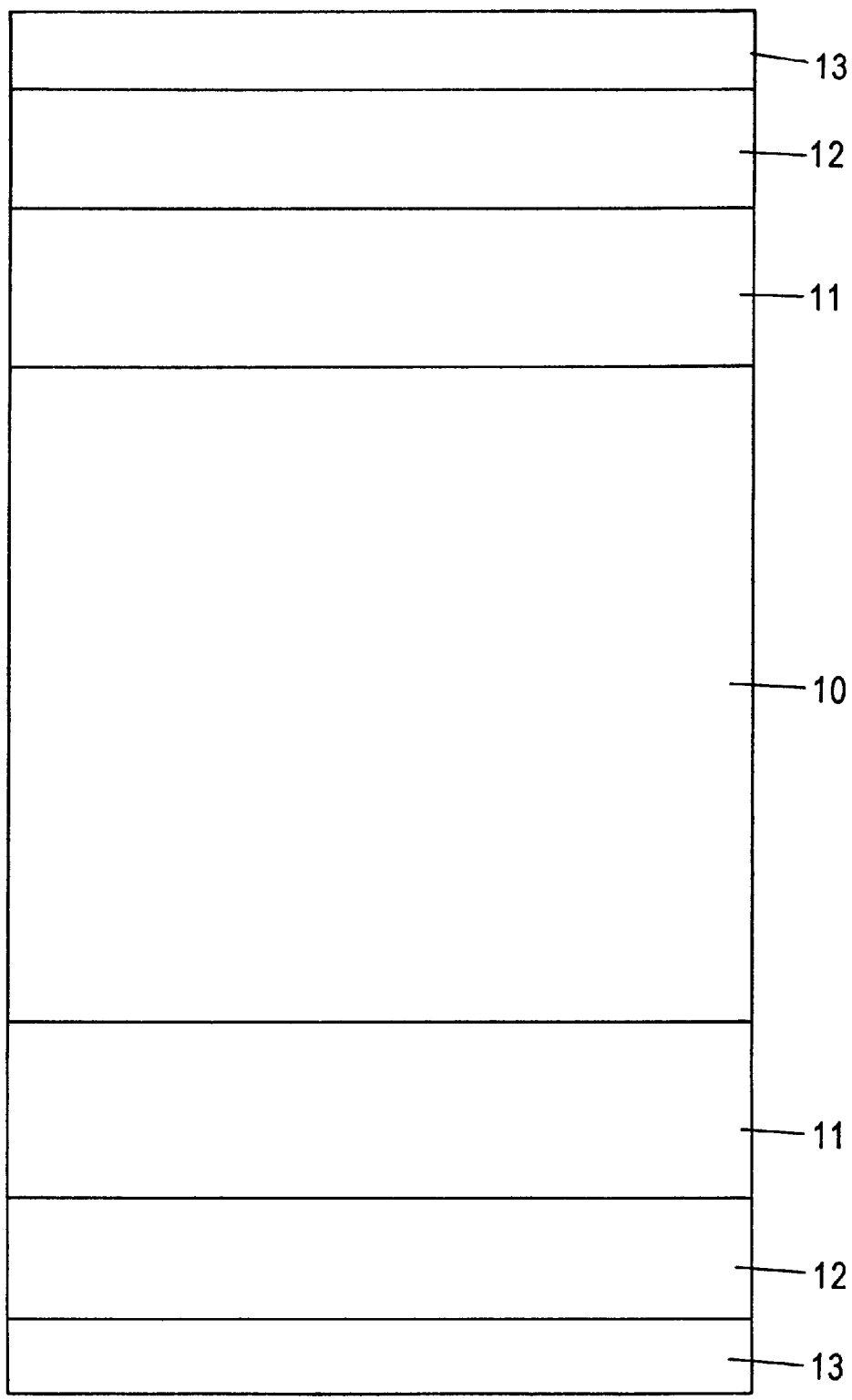
FIG. 1 schematically depicts a conventional magnetic recording medium structure.

The present invention enables the manufacture of magnetic recording media exhibiting low media noise and suitable for high density longitudinal magnetic recording employing alternate substrates comprising glass, ceramic and glass-ceramic materials having a seed layer deposited thereon, such as an NiP film. Advantageously, the present invention enables the manufacture of such magnetic recording media wherein the seed layer is tightly adhered to the substrate, thereby expanding the utility of such magnetic recording media for use in extreme environments, including high temperature and high humidity environments. This objective is achieved in accordance with various embodiments of the present invention by depositing an adhesion enhancement layer between the substrate and the seed layer, e.g., by depositing an adhesion enhancement layer directly on the substrate prior to depositing the NiP film on the adhesion enhancement layer, e.g., directly on the adhesion enhancement layer. Advantageously, the present invention can be easily integrated into existing production facilities in a cost effective manner, in that the adhesion enhancement layer can be sputter deposited. Thus, the present invention enables the production of the magnetic recording media suitable for various types of environments, including extreme environments of high temperature and/or high humidity.

Embodiments of the present invention comprise sputter-depositing an adhesion enhancement layer which is substantially chromium or a chromium alloy. Suitable chromium alloys including chromium and up to about 30 at. %, e.g., up to about 20 at. %, of an alloying element, such as titanium or vanadium. Embodiments of the present invention comprise sputter depositing a substantially chromium adhesion enhancement layer directly on a glass or glass-ceramic substrate, depositing an NiP film directly on the chromium adhesion enhancement layer, depositing an underlayer, e.g., chromium or a chromium alloy, on the NiP film, depositing a magnetic layer, e.g., a cobalt alloy, on the underlayer, and depositing a carbon-containing overcoat on the magnetic film. In addition, as in conventional practices, embodiments of the present invention include depositing a lubricant topcoat on the protective overcoat.

The crystallographic orientation and morphology of a film deposited on another film depends upon the crystallographic orientation and morphology of the underlying film. In accordance with the present invention, the use of an adhesion enhancement layer, such as chromium, deposited between the seed layer, e.g., the NiP film and the underlying glass, ceramic, or glass-ceramic substrate, does not substantially alter the advantageous crystallographic orientation and low noise of the magnetic recording medium even in magnetic recording media containing a surface-oxidized NiP film. Thus, the advantages of employing a surface-oxidized NiP film are retained using an adhesion enhancement layer. Accordingly, in embodiments of the present invention, the NiP film is surface-oxidized, as by employing the methodology disclosed in U.S. Pat. No. 5,733,370. The resulting magnetic recording medium is robust and exhibits superior recording characteristics, suitable for high density longitudinal magnetic recording.

The present invention also advantageously enables the production of a magnetic recording medium comprising a magnetic layer exhibiting a bicrystal cluster crystal orientation on a Cr-containing underlayer exhibiting a (200)-dominant crystallographic orientation, with the magnetic layer exhibiting a (11$\bar{2}$0)-dominant crystallographic orientation.

Figure 2:
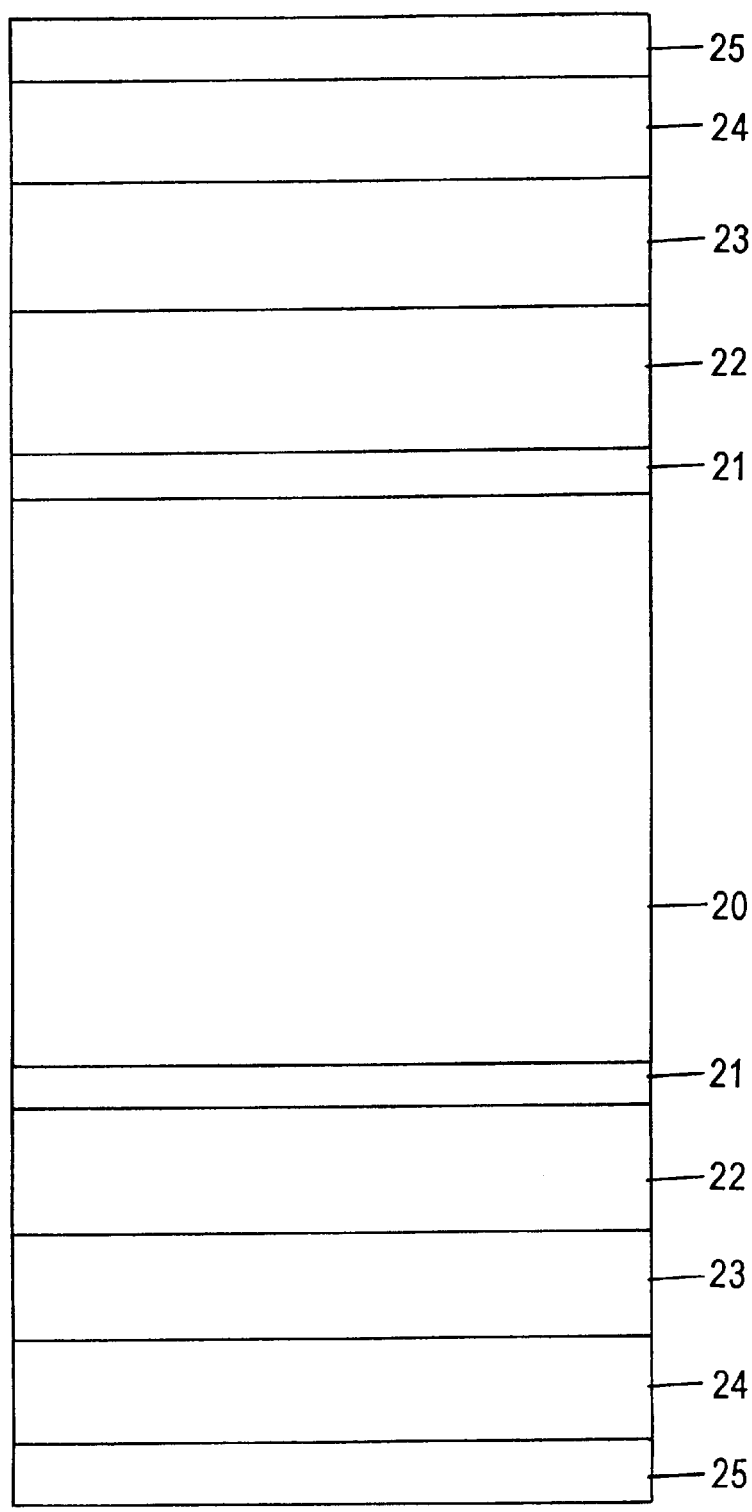
FIG. 2 schematically depicts a magnetic recording medium structure in accordance with the present invention.

An embodiment of the present invention is schematically illustrated in FIG. 2 and comprises a substrate 20, e.g., a glass, ceramic or glass-ceramic substrate, having sequentially deposited on each side thereof, adhesion enhancement layer 21, seed layer 22, underlayer 23, magnetic layer 24, and protective overcoat 25. Embodiments of the present invention also include a lubricant topcoat (not shown) deposited on protective overcoat 25.

In accordance with embodiments of the present invention, adhesion enhancement layer 21 is applied directly to substrate 20 to improve the adhesion of the subsequently deposited seed layer 22, e.g., NiP, thereon. In implementing embodiments of the present invention, any material capable of enhancing the adhesion of the seed layer can be employed. Embodiments of the present invention include depositing a chromium or chromium-alloy adhesion enhancement layer for improving adhesion of a NiP seed layer to a glass, ceramic or glass-ceramic substrate. Underlayer 23 can comprise chromium or an alloy thereof, such as chromium vanadium. Suitable magnetic layers include cobalt-alloy layers, such as a cobalt-chromium-platinum-tantalum alloy. Suitable materials for protective overcoat 25 include a hydrogenated carbonated film.

The adhesion enhancement layer, e.g., chromium or a chromium alloy, can advantageously be deposited at a thickness of about 15 Å to about 200 Å, to improve the adhesion of a NiP seed layer, without affecting the crystallographic orientation of the underlayer and magnetic layer. Advantageously, the present invention can be conducted by sputter depositing the adhesion enhancement layer, seed layer, underlayer, magnetic layer and a protective overcoat in an in-line pass-by apparatus comprising a plurality of sequentially spaced sputtering chambers.

EXAMPLE I

Six media were fabricated employing an in-line pass-by sputtering system. The film structure, according to the invention, is Cr/NiP/CrV/CoCrPtTa/C, with the films deposited in sequence from left to right. Direct current (DC) and alternate current (AC) superimposed electric potentials were applied onto carbon magnetron cathodes. DC magnetron sputtering was employed for the deposition of all other films. Hydrogenated carbon films were employed for the protective overcoat. TS-10 type of glass-ceramic substrates of 65 mm diameter and 25 mil thickness from Ohara Corporation, Japan, was used. The six samples were fabricated under substantially the same conditions employing substantially the same materials, except that the thickness of the Cr adhesion enhancement layers was varied by controlling the deposition power. The film thickness and composition in atomic percentage of these samples are listed with Table 1.

TABLE 1

| \Layer | NiP | CrV | CoCrPtTa | C |
|---|---|---|---|---|
| Composition (at. %) | Ni75, P25 | Cr80, V20 | Co73, Cr15, Pt8, Ta4 | C65, H35 |
| Thickness (Å) | 380 | 340 | 260 | 125 |

A stud pull method was employed to determine the adhesion strength between the deposited films and the glass-ceramic substrates, employing a Universal Mechanical Strength Tester from Quad Group (Spokane, Wash.). A nail shaped, epoxy coated stud was bonded to the sample surface at a curing cycle of 150° C. for one hour and pulled to coating failure at a pull rate of 10 Kg/second. The coating failure stress was recorded as a quantitative measure of adhesion. Three tests were conducted for each sample. The adhesion strengths of the three tests were averaged, and the standard deviation of the tests was obtained. The test results are summarized in Table 2.

TABLE 2

| \Sample | T7 | T8 | T9 | T10 | T11 | T6 |
|---|---|---|---|---|---|---|
| Cr Thickness (Å) | 167 | 110 | 56 | 34 | 17 | 0 |
| Average of Adhesion Strength (KPSI) | 12.2 | 9.9 | 11.9 | 11.3 | 11.9 | 10.0 |
| Standard Deviation of Adhesion Strength (KPSI) | 0.25 | 2.4 | 0.3 | 0.35 | 1.4 | 1.0 |
| Failure Mode | Epoxy | Epoxy | Epoxy | Epoxy | Epoxy | Partial Coating |

All the films with Cr films directly deposited on the glass-ceramic substrates failed with the epoxy mode. The epoxy failed cohesively in the epoxy failure mode, leaving epoxy on both the stud and the sample. The adhesion strength between the deposited films and the glass-ceramic substrates was so high that the conventional test method could not be used to obtain an adhesion failure. The media without Cr films deposited between the NiP films and the glass-ceramic substrates (sample T6) failed in the stud pull test in a partial coating failure mode at an average adhesion value of 10.0 KPSI. More than 30% of the coating was left on the sample in the partial coating failure mode.

It is apparent from the reported data that the adhesion between the deposited films and the glass-ceramic substrates was significantly enhanced by the Cr adhesion enhancement films deposited between the NiP films and the substrates.

EXAMPLE II

A Stylometer test was applied on the six of samples identified in Example I. A scratch-type adherence tester draws a hemispherical diamond across a coating at a constant rate of travel. Concurrently, an increasing normal force is imposed on the diamond until coating or substrate failure occurs. This failure force is a relative measure of adherence for coatings of a similar type. The objective of the scratch test is to identify the earliest point at which coating failure occurs. This is invariably conducted by microscopic examination of the diamond track after testing. To simplify this search, certain observable discontinuities (or events) in the tests are recorded from the plot of distance vs. three parameters. These events include an abrupt increase in the recorded noise generated by the diamond, an abrupt increase in the diamond drag force, and an abrupt increase in the effective friction. After noting the measured location on the track, the locations are used as a guide to determine the most likely coating failure site, or the critical event. Once having found the critical event, the related critical force is found from the plot and is a measure of the coating's adherence.

A Stylometer from Quad Group was used for the test. The Stylometer is a software driven diamond scratch coating adherence tester. It is intended for the testing of all types of thin films and is especially valuable in the testing of tribological or wear coatings whose adherence normally exceeds the measurement range of all other known adherence test instruments. A 125 micrometer stylus was used in the test.

The Stylometer was unsuccessful in removing the coatings on the samples with a Cr film between the NiP film and the glass-ceramic substrate. The Stylometer test produced failure in the samples with Cr layers in one of two modes: either a catastrophic complete break of the sample; or a cohesive substrate failure mode.

The coating of the sample without Cr film deposited between the NiP film and the glass-ceramic substrate (sample T6) was removed with the diamond stylus. The average, standard deviation, maximum and minimum values of the critical force of 4 tests of sample T6 are listed with Table 3.

TABLE 3

| Sample\ | Average (kg) | Standard Deviation (Kg) | Maximum (Kg) | Minimum (Kg) |
| --- | --- | --- | --- | --- |
| T6 | 0.92 | 0.59 | 1.72 | 0.47 |

EXAMPLE III

It was found that the preferred crystallographic orientation, macromagnetic properties and recording performances of the media with NiP layers deposited under CrV underlayers was maintained with the addition of Cr adhesion enhancement layers deposited between the NiP and the glass or glass-ceramic substrates. Table 4 lists the averaged macromagnetic properties of 12 discs in each group measured with a remanent moment magnetometer (RMM) manufactured by Innovative Instrumentation Incorporated of Willow Grove, Pa. All 24 discs were deposited under substantially identical conditions, except that one group of discs had about 56 Å of a Cr film deposited between the NiP films and Ohara TS-10 glass-ceramic substrates and another group of discs did not have the Cr layer. The film composition of the 24 discs is reported in Table 1 above.

TABLE 4

| Film Structure | Hcr (Oe) | Mrt (memu/cm$^2$) | Sr* |
| --- | --- | --- | --- |
| Substrate/Cr/NiP/CrV/ CoCrPtTa/C | 2682 | 0.81 | 0.82 |
| Substrate/NiP/CrV/ CoCrPtTa/C | 2663 | 0.85 | 0.81 |

In Table 4, Hcr in the unit of Oersted stands for remanent coercivity, Mrt is the product of the remanent magnetization and film thickness of the magnetic film, and Sr* stands for remanent coercivity squareness. The difference in the macromagnetic properties of the discs with and without Cr adhesion enhancement layers deposited between the NiP films and the glass-ceramic substrates is in the range of measurement accuracy, and is negligible.

Three discs with different Hcr and Mrt, and with and without Cr layers between the NiP films and Ohara TS-10 glass-ceramic substrates, were fabricated with an in-line pass-by sputtering system and compared with the recording performances. The results are listed with Table 5.

TABLE 5

| Film Structure | Hcr | Mrt (memu /cm$^2$) | SNR (dB) | PW$_{50}$ ($\mu$") | OW (dB) | MOD (%) | RWD ($\mu$") |
| --- | --- | --- | --- | --- | --- | --- | --- |
| NiP/CrV/ CoCrPtTa/C | 2551 | 0.74 | 18.6 | 11.1 | 36.4 | 10.0 | 58.0 |
| NiP/CrV/ CoCrPtTa/C | 2657 | 0.96 | 18.5 | 12.5 | 32.2 | 9.8 | 58 |
| Cr/NiP/Cr V/CoCrPt Ta/C | 2695 | 0.72 | 19.4 | 11.4 | 36.3 | 11.6 | 58.1 |

The film composition of each layer of the media in Table 5 is reported in Table 1. The macromagnetic properties, Hcr and Mrt, of the media in Table 5 were measured with a Rotating Disc Magnetometer (RDM). The recording performances, SNR, PW$_{50}$, OW, MOD, and RWD, were measured with a Guzik 1601 Read Write Analyzer (RWA) from San Jose, Calif., utilizing Yamaha magnetoresistive heads from Japan, and at the flux reversal density of 235 KFCI (thousand of flux reversals per inch). SNR denotes signal to medium noise ratio; PW$_{50}$ denotes pulse width at half of peak maximum; OW denotes overwrite; MOD denotes modulation; and RWD denotes read width. The data in Table 5 show that the recording performances of the media with a Cr adhesion enhancement layer deposited between the NiP films and the glass-ceramic substrates are competitive with those of media without Cr layers.

Figure 3:
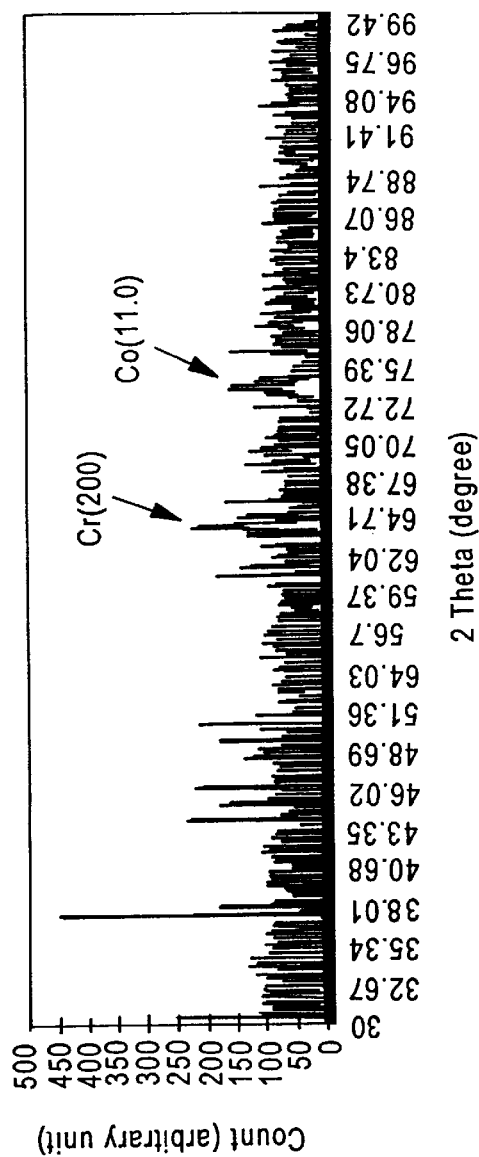
FIG. 3 is an X-ray diffraction pattern of a rigid disk medium with a chromium adhesion enhancement layer.
Figure 4:
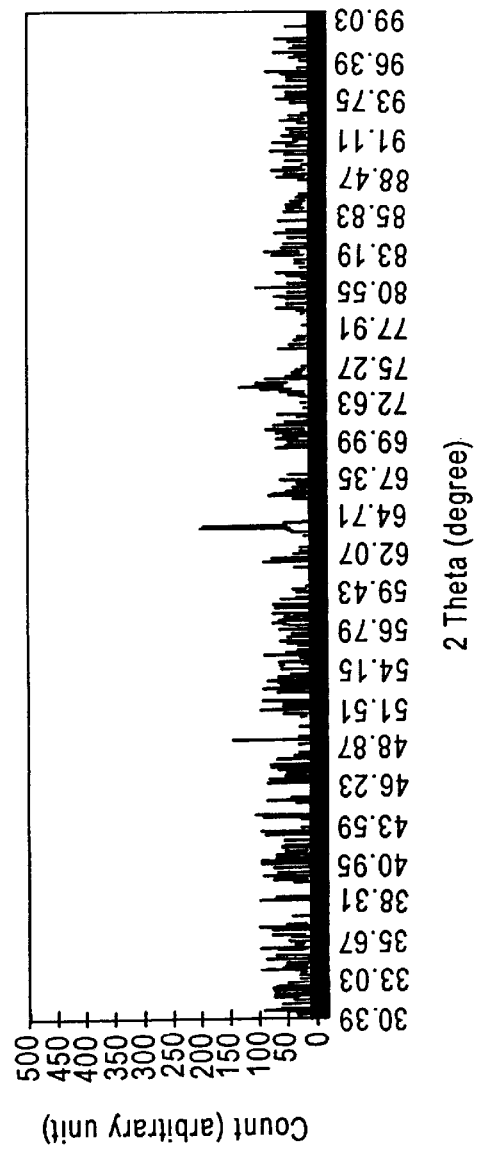
FIG. 4 is an X-ray diffraction pattern of a rigid disk medium without a chromium adhesion enhancement layer.

FIGS. 3 and 4 show the crystallographic orientation of media comprising NiP/CrV/CoCrPtTa/carbon deposited on Ohara TS-10 glass-ceramic substrates with (FIG. 3) and without (FIG. 4) a Cr adhesion enhancement layer between the NiP film and the glass-ceramic substrate, measured with an X-ray diffractometer from Scintag, Inc. of Cupertino, Calif. Both media were fabricated with an in-line pass-by sputtering system with the film composition reported in Table 1.

A comparison of FIGS. 3 and 4 shows that both media have similar microstructure revealed with the X-ray diffraction patterns. The dominant crystallographic orientation of the CrV films of both media is (200). The dominant crystallographic orientation of the CoCrPtTa film of both media is (11.0).

The Examples reveal that the crystallographic orientation, macromagnetic properties, and recording performances of media with and without Cr adhesion enhancement layers are substantially similar. The low noise features of the media with NiP layers are maintained with the addition of Cr adhesion enhancement layers deposited between the NiP films and the glass-ceramic substrates. Thus, the present invention advantageously improves the adhesion of a seed layer to a glass, ceramic, or glass-ceramic substrate without any substantial change in performance.

The underlayer employed in the present invention can comprise any of various materials conventionally employed as an underlayer in the production of magnetic recording media, such as Cr, CrV or CrTi. It has been found that an underlayer thickness of about 100 Å to about 2000 Å, such as about 550 Å, is suitable.

The magnetic layer of the present invention can comprise any magnetic alloy conventionally employed in the production of magnetic recording media. Such alloys include, but are not limited to, Co-based alloys such as CoCr, CoCrTa, CoNiCr, CoCrPtTa, CoCrPt, CoNiPt, CoNiCrPt and CoCrPtB. The thickness of the magnetic layer is consistent with the thickness of magnetic layers of conventional magnetic recording media. A Co-base alloy having a thickness of about 100 Å to about 1000 Å, such as about 200 Å to 500 Å, has been found suitable.

As in conventional magnetic recording media, a protective overcoat can be deposited on the magnetic layer by any conventional means, such as sputtering. Protective overcoats can comprise Zirconium oxide ($ZrO_2$), carbon, including hydrogenated carbon, silicon carbide (SiC), or a carbon nitride (CN). The protective overcoat is provided in a thickness suitable to protect the underlying layers. An overcoat having a thickness of about 50 Å to about 300 Å, such as about 100 Å to 200 Å has been found suitable. The apparatus employed in the present invention can be any of those sputtering apparatus conventionally employed in the production of magnetic recording medium.

As in conventional magnetic recording media, a layer of a lubricant can be applied on and bonded to the overcoat. The lubricant topcoat can be provided in any suitable thickness. A lubricant thickness of about 5 Å to 50 Å, such as about 10 Å to about 20 Å, has been found suitable.

The present invention is not limited to the specific examples disclosed, herein or the particular materials previously exemplified or mentioned. The magnetic recording media of the present invention can comprise any of various types of glass or glass-ceramic substrates, and various types of magnetic alloy layers, including various Co-based alloy magnetic layers. The underlayer of the present magnetic recording media is not limited to Cr, but can comprise various other materials, including metals exhibiting a cubic polycrystal structure. The magnetic recording media of the present invention enjoy utility in various applications, particularly applications wherein high density is required, such as a magnetic rigid disk medium for longitudinal recording.

Only certain embodiments of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A magnetic recording medium comprising:
   a substrate comprising a glass, ceramic or glass-ceramic material;
   an adhesion enhancement layer on the substrate;
   a seed layer on the adhesion layer;
   an underlayer on the seed layer; and
   a magnetic layer on the underlayer.

2. The magnetic recording medium according to claim 1, wherein the seed layer comprises nickel-phosphorous.

3. The magnetic recording medium according to claim 2, wherein the surface of the seed layer is oxidized.

4. The magnetic recording medium according to claim 2, wherein the adhesion enhancement layer comprises chromium or a chromium-alloy.

5. The magnetic recording medium according to claim 4, wherein the thickness of the adhesion enhancement layer is about 15 Å to about 200 Å.

6. The magnetic recording medium according to claim 5, wherein the adhesion enhancement layer comprises a chromium alloy containing chromium and up to about 30 at. % of an alloying metal.

7. The magnetic recording medium according to claim 6, wherein the chromium alloy is chromium-vanadium or chromium-titanium.

8. The magnetic recording medium according to claim 1, wherein the seed layer has an oxidized surface.

9. The magnetic recording medium according to claim 8, wherein:
   the seed layer comprises nickel-phosphorous;
   the adhesion enhancement layer is substantially chromium;
   the underlayer comprises a chromium-vanadium alloy having a (200)-dominant crystallographic orientation;
   the magnetic layer comprises a cobalt-chromium-platinum-tantalum alloy;
   and the magnetic recording medium comprises a carbon-containing overcoat.

10. The magnetic recording medium according to claim 9, wherein the underlayer exhibits a predominant (200) crystallographic orientation and the magnetic layer exhibits a bicrystal cluster microstructure.

11. A method of manufacturing a magnetic recording medium, which method comprises:
    depositing an adhesion enhancement layer on a substrate comprising a glass, ceramic or glass-ceramic material;
    depositing a seed layer on the adhesion layer;
    depositing an underlayer on the seed layer; and
    depositing a magnetic layer on the underlayer.

12. The method according to claim 11, comprising depositing a nickel-phosphorous seed layer.

13. The method according to claim 12, comprising oxidizing the surface of the seed layer.

14. The method according to claim 13, comprising oxidizing the surface of the seed layer in an atmosphere of air or a mixture of argon and oxygen at a pressure of of about 0.1 mTorr to about 200 Torr at a temperature of about 20° C. to about 280° C.

15. The method according to claim 12, comprising depositing an adhesion enhancement layer containing chromium or a chromium-alloy.

16. The method according to claim 15, comprising depositing the adhesion enhancement layer at a thickness of about 15 Å to about 200 Å.

17. The method according to claim 16, comprising depositing an adhesion enhancement layer containing a chromium alloy having up to about 30 at. % of an alloy element.

18. The method according to claim 15, comprising depositing an adhesion enhancement layer comprising an alloy of chromium with vanadium or titanium.

19. The method according to claim 11, comprising oxidizing the surface of the seed layer.

20. The method according to claim 19, comprising:
    depositing a substantially chromium adhesion enhancement layer;
    depositing a nickel-phosphorous seed layer;
    depositing a chromium-vanadium alloy underlayer having a (200)-dominant crystallographic orientation;
    depositing a cobalt-chromium-platinum-tantalum magnetic alloy layer exhibiting a bicrystal cluster microstructure; and
    depositing a carbon-containing overcoat.

* * * * *